United States Patent [19]

Arai et al.

[11] Patent Number: 4,653,799
[45] Date of Patent: Mar. 31, 1987

[54] APPARATUS FOR HOUSING ELECTRICAL WIRING EXTENDING BETWEEN A VEHICLE DOOR AND A VEHICLE BODY

[75] Inventors: Hiroshi Arai; Kazunobu Fukushima, both of Toyota, Japan

[73] Assignee: Toyota Jidosha Kabushiki Kaisha, Japan

[21] Appl. No.: 654,180

[22] Filed: Sep. 25, 1984

[30] Foreign Application Priority Data

Sep. 26, 1983 [JP] Japan ............................ 58-148660[U]
Sep. 29, 1983 [JP] Japan ............................ 58-151081[U]

[51] Int. Cl.⁴ ........................ B60J 5/00; E05D 15/28; E06B 3/32
[52] U.S. Cl. .................................... 296/146; 296/208; 16/223; 16/370; 49/167; 49/248; 174/86
[58] Field of Search ................. 296/146, 208; 174/86; 16/302, 370, 223; 339/4; 49/167, 246, 248

[56] References Cited

U.S. PATENT DOCUMENTS

| | | | |
|---|---|---|---|
| 2,094,656 | 10/1937 | Holt | 339/4 |
| 2,416,118 | 2/1947 | Parsons | 49/167 |
| 2,993,730 | 7/1961 | Weiertz | 296/146 |
| 3,042,471 | 7/1962 | Haslup | 339/4 X |
| 3,053,564 | 9/1962 | Evans et al. | 339/4 X |
| 3,758,990 | 9/1973 | Balanos | 296/146 X |
| 3,842,386 | 10/1974 | Suska | 174/86 X |
| 3,848,361 | 11/1974 | Foster et al. | 49/167 |

Primary Examiner—Robert B. Reeves
Assistant Examiner—Dennis H. Pedder
Attorney, Agent, or Firm—Finnegan, Henderson, Farabow, Garrett & Dunner

[57] ABSTRACT

An apparatus for housing electrical wiring extending between a vehicle door and a vehicle body. A first link is pivotally connected to the vehicle door and the vehicle body for pivoting the door away from the vehicle body. A second link is pivotally connected to the vehicle door and the vehicle body rearward of the first link along the length of the vehicle. The second link cooperates with the first link to pivot the vehicle door away from the vehicle body. The second link includes a pivotal support frame, a conduit section, and a clamping member for removably clamping the pivotal support frame and the conduit section together to enable the conduit section to be detached from the pivotal support frame. When clamped, the pivotal support frame and the conduit section define a conduit therebetween. Electrical wiring extends within the conduit for providing electrical wiring between the vehicle door and the vehicle body. Grommets are affixed at opposite ends of the wiring to secure each end of the wiring to the vehicle door and to the vehicle body, respectively.

10 Claims, 6 Drawing Figures

APPARATUS FOR HOUSING ELECTRICAL WIRING EXTENDING BETWEEN A VEHICLE DOOR AND A VEHICLE BODY

BACKGROUND OF THE INVENTION

1. Field of the Invention

This invention relates to a conduit for supporting electrical wiring between a vehicle body and a side door of a motor vehicle, utilizing a hinge mechanism having a quadric crank chain.

2. Description of the Prior Art

In most cases, the side door in a motor vehicle, such as a passenger car, is installed in a manner to be rotatable about a hinge affixed to a vehicle body for opening or closing. In order to allow an occupant of the motor vehicle to open or close the side door for getting in or out of the motor vehicle, a door opening angle corresponding to the total length of the side door is required. With this construction, when a space at the side of the motor vehicle is small, there are many instances where it is difficult for the occupant to get on or off the vehicle because the side door cannot be opened sufficiently.

In contrast a side door hinge mechanism in a motor vehicle may include a quadric crank chain. Such a mechanism comprises a front rotary link interconnecting two points which are disposed at the forward portions of a vehicle body and a side door constituting two rotary centers out of four pivotal points. The four pivotal points include two points disposed on the vehicle body and spaced apart from each other in the longitudinal direction of the vehicle body and two points disposed on the side door and spaced apart from each other in the longitudinal direction of the side door. A rotary link interconnecting two points disposed at the rear sides as rotary centers, a portion between the two points on the vehicle body, and a portion between the two points on the side door.

With the side door hinge mechanism utilizing the above-described quadric crank chain, a required space at the side of the door can be reduced while a desired space around feet of the occupant is secured. As a consequence, even when the space at the side of the door is small, the occupant can open or close the side door to get in or out of the vehicle.

Now, in general, in the side door of a motor vehicle, there may be provided a power window regulator, a device for controlling the power window regulator, an electromagnetic lock device and a switch for operating the lock device. In this case the side door and a vehicle body are electrically connected to each other through a wire harness.

When the side door utilizing the quadric crank chain and the vehicle body are connected to each other by use of the wire harness, the inner end portion of the side door, which differs from the side door having an ordinary hinge mechanism, is greatly separated from the vehicle body during the opening of the door. This construction makes it is difficult to provide a route for the wire harness.

Furthermore, when the vehicle body and the side door are connected through the wire harness, the working stroke of the side door during the opening or closing is larger than that of the side door having the conventional hinge mechanism as described above, so that it becomes difficult to house the wire harness during the closing of the door.

Further, the wire harness should be installed with at least a portion thereof being exposed in a compartment to facilitate the workability of installation. However when the wire portion is exposed, there is presented a problem that the exposed portion should be rigged in order to match with the coloring of the interior of the compartment, and the like.

In contrast thereto, to absorb the great opening and closing strokes of the side door by the wire harness, there may be proposed to use electric wire and molded parts, which are of special shapes. In this case, such disadvantages are presented that the cost is increased and installation becomes more difficult.

Furthermore, to obviate the above-described disadvantage, opposing electric contact points may be used, which are brought into contact with each other when the side door is closed. These contact points are provided on the side door and the vehicle body and no wire harness is used. In this case, such problems are presented that it is difficult of compose circuits of a multiplicity of types and the cost is increased.

Furthermore, in the side door having the hinge mechanism utilizing the above-described quadric crank chain, at least one of the rotary links interconnecting the vehicle body and the side door is exposed in the compartment.

As a consequence, in this case, the side surface of the rotary link exposed in the compartment should be covered by an interior trim material, however, the color and material quality of interior trim material are varied depending upon the coloring of the interior of the compartment, grade and the like. The installation of the interior trim material on the rotary link also should be easy as viewed from the workability of installation.

SUMMARY OF THE INVENTION

It is therefore the primary object of this invention to provide a conduit construction for supporting electrical wiring between a vehicle body and a side door of a motor vehicle, wherein great opening and closing strokes are absorbed with no special wiring and molded parts being used, and wherein a wire harness is reliably housed during the closing the door.

Another object of this invention is to provide a conduit construction for supporting electrical wiring between a vehicle body and a side door of a motor vehicle, wherein great opening and closing strokes are absorbed with no special wiring and molded parts being used, wherein a wire harness is reliably housed during the closing of the door, and wherein special rigging and the like are not applied and the wiring is installed easily.

To achieve the foregoing objectives, the present invention includes a conduit to provide electrical wiring between a vehicle body and a side door of a motor vehicle including a wire harness for electrically connecting a vehicle body to the side door having a hinge mechanism having a quadric crank chain, which comprises: a first rotary link interconnecting respective points on one side of the vehicle body and the side door as rotary centers out of four points, which include two points disposed on the vehicle body and spaced apart from each other and two points disposed on the side door and spaced apart from each other; a second rotary link interconnecting two points disposed at the other sides as rotary centers; a portion between the two points on the vehicle body; and another portion between the two points on the side door; wherein the wire harness is wired through at least one of the rotary links.

To the above end, the present invention contemplates that a portion of the wire harness passed through the rotary link which is fixed to the vehicle body, is offset from the rotary link in the vertical direction of the vehicle body.

To the above end, the present invention contemplates that the offset value of the fixed portion of said wire harness on the vehicle body's side from said rotary link is determined so that during rotation of said rotary link about the rotary center on the vehicle body, when the wire harness is twisted, the amount of the resultant twist can be absorbed.

To the above end, the present invention contemplates that the first and second rotary links use a different point on a front pillar and a different point on the side door on the compartment's side as rotary centers.

To the above end, the present invention contemplates that a portion of said wire harness, is fixed to the front pillar on the side of the vehicle body.

To the above end, the present invention contemplates that, in a conduit for supporting electrical wiring between a vehicle body and a side door of a motor vehicle including a wire harness for electrically connecting a vehicle body to the side door having a hinge mechanism having a quadric crank chain, which comprises: a first rotary link interconnecting two points disposed at the forward sides of the vehicle body and the side door as rotary centers out of four points, which include two points disposed on the vehicle body and spaced apart from each other in the longitudinal direction of the vehicle body and two points disposed on the side door and spaced apart from each other in the longitudinal direction of the side door; a second rotary link interconnecting two points disposed at the rear sides as rotary centers; a portion between the two points on the vehicle body; and another portion between the two points on the side door; an interior trim material being of a substantially U-shape in cross section which is open to the outside of the compartment and includes upper and a lower pawls engageable with the top and bottom ends of the outer surface of at least one of the first and second rotary links on the forward end thereof in the direction to which the outside of the compartment is secured to the first and second rotary links, the interior trim covering the surface of the first and second rotary links on the compartment's side, wherein the wire harness is wired and extends through a closed section formed between the U-shape of the interior trim material and the rotary link.

To the above end, the present invention contemplates that said first and second rotary links are formed into a U-shape in cross section open to the compartment's side and said wire harness is wired, extending through said u-shape of one of the rotary links.

To the above end, the present invention contemplates that said rotary link is formed into a flat plate shape in cross section which blocks an opening of said interior trim material being of a U-shape in cross section.

According to the invention, the wire harness is wired and extends through a link interconnecting the vehicle body and the side door, so that great opening and closing strokes of the side door are absorbed and the wire harness is reliably housed in the first or second rotary link during the closing of the door.

According to the invention, the wire harness is wired, extending through a space formed between a link interconnecting the vehicle body and the side door and the interior trim material, whereby great opening and closing strokes of the side door are absorbed, so that the wire harness can be reliably housed in the rotary link during the closing of the door and the wire harness can be easily and quickly installed together within the interior trim material of the first or second rotary link when installed.

DETAILED DESCRIPTION OF THE PREFERRED EMBODIMENT

The following description relates to embodiments of the present invention with reference to the drawings.

Figure 1:
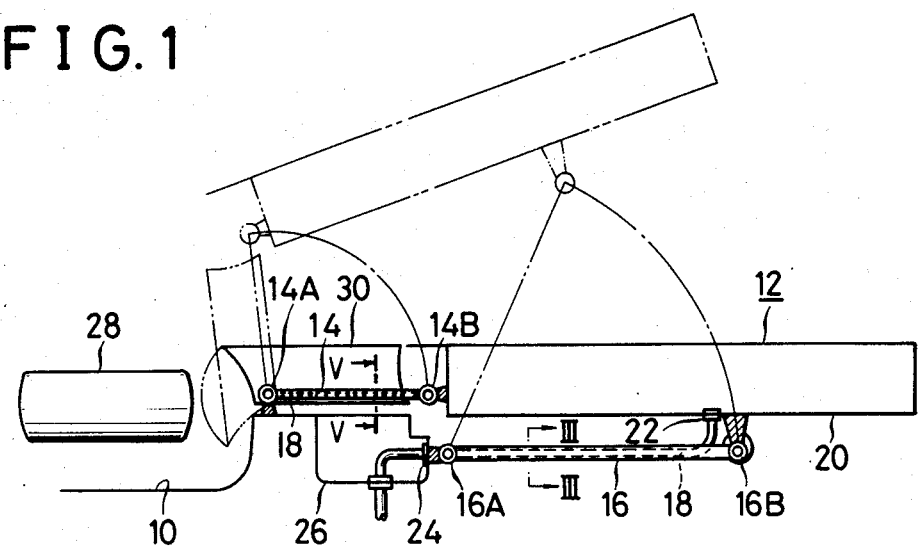
FIG. 1 is a schematic sectional view showing an embodiment of the apparatus providing electrical wiring between the vehicle body and the side door of a motor vehicle.
Figure 2:
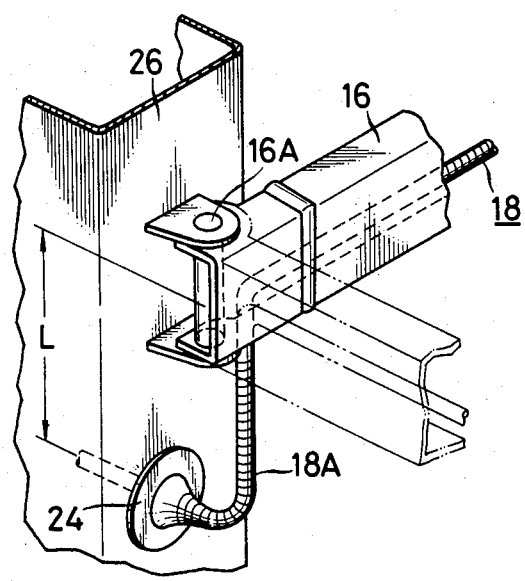
FIG. 2 is a perspectiive view showing the essential portions of the above embodiment.

As shown in FIGS. 1 and 2, according to one embodiment, a conduit construction for providing electrical wiring between a vehicle body and a side door of a motor vehicle including a wire harness 18 for electrically connecting a vehicle body 10 to the side door 12 through a hinge mechanism, having a quadric crank chain, comprises: a first rotary link 14 interconnecting two points disposed at the forward sides of the vehicle body 10 and the side door 12 as rotary centers 14A and 14B a second rotary link 16 interconnecting two points disposed at the rear of said rotary centers 14A and 14B of the vehicle body 10 and the side door as rotary centers 16A and 16B; a portion between the two rotary centers 14A and 16A on the vehicle body 10; and another portion between the two rotary centers 14B and 16B on the side door 12; wherein the wire harness 18 is wired and extends through the rotary link 16.

The first and second rotary links 14 and 16 are each formed into a U-shape in cross section, and the wire harness 18 is wired, extending through the interior of the U-shape of one of the rotary links.

A portion of the wire harness 18 on the side of the side door 12 is extended from the rotary link 16, passed through a grommet 22 secured to an inner panel 20 of the side door 12 and connected into the side door 12.

Furthermore, at a position at the end of the rotary link 16, which is on the side of the vehicle body 10, the wire harness 18 is suspended downwardly from the second rotary link 16 and offset a distance L from the second rotary link 16, then passed through a grommet 24 and connected into the vehicle body 10.

The offset value L of the grommet 24 with respect to the second rotary link 16 is determined so that during the rotation of the rotary link 16 about the rotary center 16A, i.e. when the wire harness 18 is twisted the amount of, the resultant twist can be absorbed.

In the drawings, designated at 26 is a front pillar, 28 a front wheel and 30 a movable fender rotatable with the first rotary link 14.

In this embodiment, the wire harness 18 electrically connects the vehicle body 10 to the side door 12 and extends through the U-shape of the cross section of the second rotary link 16, sso that the great opening and closing strokes of the side door 12 can be satisfactorily followed to interconnect the vehicle body 10 and the side door 12, and the wire harness 18 can be reliably housed in the second rotary link 16 during the closing of the door.

Particularly, in this embodiment, the grommet 24 has been disposed downwardly of the second rotary link 16 in a manner to be offset from the rotary link 16, so that the twist can be absorbed, which, due to the rotation of the side door 12, is generated in a suspended portion 18A of the wire harness 18, namely, suspended from the end portion of the second rotary link 16 on the side of the vehicle body 10.

Additionally, in the above embodiment, the wire harness 18 has been wired only through the second rotary link 16, however, the wire harness 18 may be wired only through the second rotary link 14 or through both the first and second rotary links 14 and 16.

Furthermore, the grommet 24 on the vehicle body 10 is disposed downwardly of the second rotary link 16 in a manner to be offset from the second rotary link 16, however, the grommet 24 may be disposed upwardly of the second rotary link 16 in a manner to be offset from the second rotary link 16.

Further, affixing means, such as grommets 22 and 24, have been provided for protecting and securing the portions of the wire harness 18 extending through the side door 12 and the vehicle body 10, however, protectors other than the grommets may be provided.

Furthermore, in the above embodiment, each rotary link has been formed into a U-shape in cross section, through which the wire harness 18 has been wired, however, the present invention need not necessarily be limited to this, and each rotary link may be formed into a closed section, through which the wire harness 18 may be wired.

In this case, it is advantageous that the wire harness 18 can be further reliably protected.

Furthermore, in the above embodiment, the pairs of two points on the vehicle body and the side door, which are spaced apart from each other in the longitudinal direction have been used as the rotary centers, however, the present invention need not necessarily be limited to this, and pairs of two points on the vehicle body or the side door, which are spaced apart from each other may be used as the rotary center only if these rotary centers can form the quadric crank chain.

The following description relates to a second embodiment of the present invention with reference to the drawings.

Figure 3:
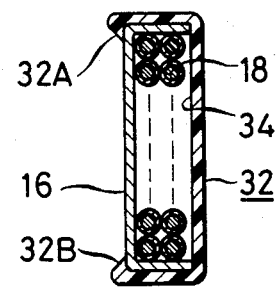
FIG. 3 is a schematic enlarged view taken along a line III—III in FIG. 1, showing an embodiment of the conduit construction for supporting electrical wiring between the vehicle body and the side door of a motor vehicle.

In this embodiment, a conduit construction for supporting electrical wiring between a vehicle body and a side door of a motor vehicle, as shown in FIG. 1, includes a wire harness 18 for electrically connecting a vehicle body 10 to the side door 12 through a hinge mechanism having a quadric crank chain, comprises: a first rotary link 14 interconnecting two points disposed at the forward sides of the vehicle body 10 and the side door 12 as rotary centers 14A and 14B out of four points including two points disposed on the vehicle body 10 and spaced apart from each other in the longitudinal direction of the vehicle body 10 and two points disposed on the side door 12 and spaced apart from each other in the longitudinal direction of the side door 12; a second rotary link 16 functions as a pivotable support frame interconnecting two points disposed at the rear sides as rotary centers 16A and 16B; a portion between the two points 14A and 16A on the vehicle body 10; and another portion between the two points 14B and 16B on the side door 12; and as shown in FIG. 3, a conduit section, i.e., an interior trim material 32 being of a substantially U-shape in cross section is open to the outside of the compartment and includes upper and lower pawls 32A and 32B clampingly engageable with the top and bottom ends of the outer surface of the second rotary link 16 on the forward end thereof in the direction facing the outside of the compartment the interior trim material, covering the surface of the second rotary link 16 on the compartment's side, and the wire harness 18 is wired, extending through a conduit, such as closed section 34 formed between the U-shape of the interior trim material 32 and the second rotary link 16.

The rotary link 16 is formed into the U-shape in cross section open to the compartment's side and the wire harness 18 is wired in and affixed to the U-shape. The opening of the U-shape of the rotary link 16 is blocked by the interior trim material 32 being of a U-shape in cross section.

Here, the wire harness 18 is previously formed into a ribbon shape having a section substantially coinciding with the section of the aforesaid closed section 34.

In this embodiment, the wire harness 18 electrically connects the vehicle body 10 to the side door 12 and extends through the closed section 34 formed by the second rotary link 16 and the interior trim material 32, so that the great opening and closing strokes of the side door 12 can be satisfactorily followed to interconnect the vehicle body 10 and the side door 12, the wire harness 18 can be reliably housed in the closed section 34 formed between the rotary link 16 and the interior trim material 32 during the closing of the door, and, in installing the wire harness 18, the interior trim material 32 can be mounted to the rotary link 16 by use of the pawls 32A and 32B thereof by one touch operation to cover and protect the wire harness 18 and to improve the appearance of the interior of the compartment.

Particularly, in this embodiment, the interior trim material 32 additionally functions to support the wire harness 18 adjacent the side door eliminating the requirement for rigging material extending from the inner panel 20.

Figure 4:
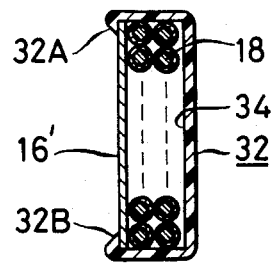
FIG. 4 is a schematic enlarged view similar to FIG. 3 taken along the line III—III in FIG. 1, showing another embodiment of the conduit construction for supporting electrical wiring between the vehicle body and the side door of a motor vehicle.

Here, in the above embodiment, the second rotary link 16 has been formed into the substantially U-shape in cross section open to the compartment's side, however, the present invention need not be necessarily limited to this. For example, the second rotary link 16 may form the closed section 34 in cooperation with the interior trim material 32 which may be substantially U-shape in cross section. In consequence, as shown in FIG. 4, the second rotary link 16 may be formed into a flat plate-shaped member 16'.

Figure 5:
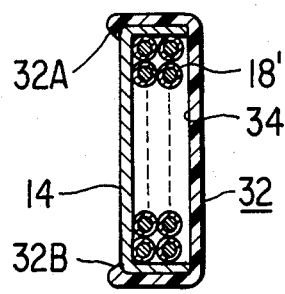
FIG. 5 is a schematic enlarged view similar to FIG. 3 taken along the line v—v in FIG. 1, showing another embodiment of the conduit construction for supporting electrical wiring between the vehicle body and the side door of a motor vehicle.
Figure 6:
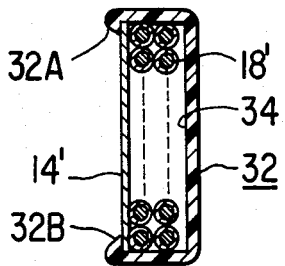
FIG. 6 is a schematic enlarged view similar to FIG. 4 taken along the line v—v in FIG. 1, showing another embodiment of the conduit construction for supporting electrical wiring between the vehicle body and the side door of a motor vehicle.

In the above embodiment, the wire harness 18 has been wired in the second rotary link 16 and a wire harness 18' may be wired only through the second rotary link 14, 14', as shown in FIGS. 5 and 6 or through the both rotary links 14 and 16, in the manner previously described only with respect to the second rotary link 16.

What is claimed is:

1. An apparatus for housing electrical wiring extending between a vehicle door and a vehicle body comprising:

first link means pivotally connected to the vehicle door and the vehicle body for pivoting the door away from the vehicle body;

second link means pivotally connected to the vehicle door and the vehicle body rearward of the first link means along the length of the vehicle for cooperating with the first link means to pivot the vehicle door away from the vehicle body, wherein said second link means includes a pivotable support frame, a conduit section, and means for removably clamping said pivotable support frame and said conduit section together enabling said conduit section to be detached from said pivotable support frame, said pivotable support frame and said conduit section defining a conduit therebetween when clamped;

wiring means extending within said conduit for providing electrical wiring between the vehicle door and the vehicle body; and means affixed at opposite ends of said wiring means for securing each end of said wiring means to the vehicle door and the vehicle body, respectively.

2. The apparatus as defined in claim 1, wherein said support frame and said conduit section have substantially U-shaped configurations of differing dimensions, wherein said smaller dimensioned U-shaped configuration is reversibly mounted within said larger dimensioned U-shaped configuration.

3. The apparatus as defined in claim 2, wherein said clamping means are affixed to opposite ends of said larger dimensioned U-shaped configuration.

4. The apparatus as defined in claim 1, wherein said support frame has a substantially planar surface and said conduit section has a substantially U-shaped frame enabling said planar surface and said conduit section to have a substantially rectangular cross-section when clamped together.

5. The apparatus as defined in claim 1, wherein said securing means secured to the vehicle body is vertically spaced a predetermined distance from said second link means to minimize twisting of said wiring means.

6. The apparatus as defined in claim 2, wherein said securing means secured to the vehicle body is vertically spaced a predetermined distance from said second link means to minimize twisting of said wiring means.

7. The apparatus as defined in claim 3, wherein said securing means secured to the vehicle body is vertically spaced a predetermined distance from said second link means to minimize twisting of said wiring means.

8. The apparatus as defined in claim 4, wherein said securing means secured to the vehicle body is vertically spaced a predetermined distance from said second link means to minimize twisting of said wiring means.

9. An apparatus for housing electrical wiring extending between a vehicle door and a vehicle body comprising:

first link means pivotally connected to the vehicle door and the vehicle body for pivoting the door away from the vehicle body, wherein said first link means includes a pivotable support frame, a conduit section, and means for removably clamping said pivotable support frame and said conduit section together, enabling said conduit section to be detached from said pivotable support frame, said pivotable support frame and said conduit section defining a conduit therebetween when clamped;

second link means pivotally connected to the vehicle door and the vehicle body rearward of the first link means along the length of the vehicle for cooperating with the first link means to pivot the vehicle door away from the vehilce body; and wiring means extending within said conduit for providing electrical wiring between the vehicle door and the vehicle body.

10. An apparatus for housing electrical wiring extending between a vehicle door and a vehicle body comprising:

first link means pivotally connected to the vehicle door and the vehicle body for pivoting the door away from the vehicle body, wherein said first link means includes a first pivotable support frame, a first conduit section, and first means for removably clamping said first pivotable support frame and said first conduit section together, enabling said first conduit section to be detached from said first pivotable support frame, said first pivotable support frame and said first conduit section defining a first conduit therebetween when clamped;

second link means pivotally connected to the vehicle door and the vehicle body rearward of the first link means along the length of the vehicle body for cooperating with the first link means to pivot the vehicle door away from the vehicle body, said second link means includes a second pivotable support frame, a second conduit section, and second means for removably clamping said second pivotable support frame and said second conduit section together, said second pivotable support frame and said second conduit section defining a second conduit therebetween;

wiring means extending within said first and second conduits for providing electrical wiring between the vehicle door and the vehicle body; and means affixed at opposite ends of said wiring means extending within said second conduit for securing each end of said wiring means within said second conduit to the vehicle door and the vehicle body, wherein said securing means secured to the vehicle body is positioned to minimize twisting of said wiring means.

* * * * *